US007501834B2

(12) United States Patent
Madni et al.

(10) Patent No.: US 7,501,834 B2
(45) Date of Patent: Mar. 10, 2009

(54) VOICE COIL ACTUATOR WITH EMBEDDED CAPACITIVE SENSOR FOR MOTION, POSITION AND/OR ACCELERATION DETECTION

(75) Inventors: Asad M. Madni, Los Angeles, CA (US); Jim B. Vuong, Northridge, CA (US); Robert K. Hansen, Burbank, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 548 days.

(21) Appl. No.: 11/159,572

(22) Filed: Jun. 21, 2005

(65) Prior Publication Data

US 2007/0003099 A1 Jan. 4, 2007

(51) Int. Cl.
*G01R 27/26* (2006.01)
*H04R 9/06* (2006.01)

(52) U.S. Cl. .................................. 324/658; 381/400

(58) Field of Classification Search ................ 324/658, 324/649, 600, 244, 259; 310/14, 23; 381/59, 381/96, 400, 185, 401; 720/666; 73/1.79; 702/94, 95; 251/905; 360/264.7, 266.4
See application file for complete search history.

(56) References Cited

U.S. PATENT DOCUMENTS

| 4,498,023 | A |   | 2/1985 | Stout |   |
|---|---|---|---|---|---|
| 5,310,064 | A | * | 5/1994 | Neff et al. | 209/604 |
| 5,621,293 | A |   | 4/1997 | Gennesseaux |   |
| 6,293,680 | B1 | * | 9/2001 | Bruns | 359/849 |
| 6,382,246 | B2 | * | 5/2002 | Mori et al. | 137/554 |
| 6,768,610 | B1 | * | 7/2004 | Morris et al. | 360/78.07 |
| 7,009,682 | B2 | * | 3/2006 | Bleeker | 355/53 |
| 7,141,988 | B2 | * | 11/2006 | Chertok | 324/661 |
| 2003/0020472 | A1 |   | 1/2003 | Kretschmann et al. |   |

(Continued)

FOREIGN PATENT DOCUMENTS

JP          5-300718          11/1993

(Continued)

OTHER PUBLICATIONS

BEI Technologies; Voice Coil Actuators: An Applications Guide; pp. 1-12; USA.
European Search Report for European Application No. 06075173.2 mailed on Nov. 16, 2006.

(Continued)

*Primary Examiner*—Diego Gutierrez
*Assistant Examiner*—Hoai-An D Nguyen
(74) *Attorney, Agent, or Firm*—Christie, Parker & Hale, LLP

(57) ABSTRACT

A voice coil actuator having a capacitive sensor. A magnetic housing contains at least one magnet, and has a wall that defines a first cavity. A magnetic core is coupled to the magnetic housing and extend from an interior surface of the magnetic housing in a direction of a center axis of the wall of the magnetic housing. A coil assembly has a wall defining a second cavity that at least partly envelops the magnetic core, disposed at least partly inside the first cavity, and adapted to move linearly with respect to the magnetic housing. The coil assembly forms a capacitive sensor with the magnetic core, the capacitive sensor adapted to measure at least one of position, velocity and acceleration of the coil assembly with respect to the magnetic housing.

20 Claims, 5 Drawing Sheets

U.S. PATENT DOCUMENTS

| | | | |
|---|---|---|---|
| 2003/0090266 A1 | 5/2003 | Kesil et al. | |
| 2004/0100440 A1* | 5/2004 | Levin et al. | 345/156 |
| 2004/0156526 A1 | 8/2004 | Godkin | |
| 2005/0031140 A1* | 2/2005 | Browning | 381/96 |

FOREIGN PATENT DOCUMENTS

| | | |
|---|---|---|
| JP | 8-247025 | 9/1996 |
| JP | 2007-524841 | 8/2007 |
| WO | WO 2005/003688 | 1/2005 |

OTHER PUBLICATIONS

Asad M. Madni, et al., *The Next Generation of Position Sensing Technology*, Part 1 and Part 2, Sensors The Journal of Applied Sensing Technology, Mar. & Apr. 2001, vol. 18, No. 3 & 4, Advanstar Publication, 16 pages.

Office Action, with English translation, dated Sep. 10, 2008, for corresponding Japanese Patent Application No. 2006-170615.

Patent Abstracts of Japan for Publication No. 08-247025, date of Publication of Application Sep. 24, 1996 in the name of Yamamoto et al.

* cited by examiner

VOICE COIL ACTUATOR WITH EMBEDDED CAPACITIVE SENSOR FOR MOTION, POSITION AND/OR ACCELERATION DETECTION

FIELD OF THE INVENTION

The present invention generally relates to sensors and more specifically to motion, position and/or acceleration sensors capable of operating in the presence of significant magnetic fields.

BACKGROUND

A simple voice coil actuator is an ideal solution for many applications requiring precise movement, such as semiconductor equipment, defense systems and life-sustaining medical systems due to the simple, non-contacting structure of the design. The structure is typically the same as that found in a simple speaker.

The voice coil actuator is a direct drive, limited motion device that utilizes a permanent magnetic field and a coil winding (conductor) to produce a force proportional to the current applied to the coil. The permanent magnetic field is provided by a permanent magnetic housing containing one or more permanent magnets, while the coil winding is a part of a coil assembly that moves in-and-out of the permanent magnetic housing along the axis thereof.

The Lorentz principle governs the electromechanical conversion mechanism of a voice coil actuator. This law of physics states that if a current-carrying conductor is placed in a magnetic field, a force will act upon it. The magnetic flux density, "B", the current, "I", and the orientation of the field and current vectors determine the magnitude of this force. Further, if a total of "N" conductors (in series) of length "L" are placed in the magnetic field, the force acting upon the conductors is given by: F=KBLIN, where K is a constant. Hence, the force applied between the coil assembly and the permanent magnetic housing is proportional to the amount of current flowing through the coil.

For voice coil actuator applications, it is desirable to measure the motion, position and/or acceleration of the coil assembly with respect to the permanent magnetic housing when a current of certain magnitude is applied. Due to the strong magnetic field in the voice coil actuator, linear variable displacement transducers (LVDTs) are not suitable for such measurements.

Currently, potentiometers and optical sensors are used with the voice coil actuator, but they have their own shortcomings. By way of example, using potentiometers, variable resistors or other contact sensors will turn the voice coil actuator into a contact device, which is limited by the lifecycle due to wear and tear of the contacts. In addition, much noise is generated under vibration due to the use of contact fingers. Further, optical sensors must be mounted externally to the voice coil actuator, and is very costly.

Therefore, it is desirable to provide a non-contact sensor that can be embedded within the voice coil actuator to measure a movement between the coil assembly and the permanent magnetic housing, which is substantially impervious to the strong magnetic field in the voice coil actuator.

SUMMARY

In an exemplary embodiment according to the present invention, a voice coil actuator has a capacitive sensor. A magnetic housing contains at least one magnet, and has a wall that defines a first cavity. A magnetic core is coupled to the magnetic housing and extend from an interior surface of the magnetic housing in a direction of a center axis of the wall of the magnetic housing. A coil assembly has a wall defining a second cavity that at least partly envelops the magnetic core, disposed at least partly inside the first cavity, and adapted to move linearly with respect to the magnetic housing. The coil assembly forms a capacitive sensor with the magnetic core, the capacitive sensor adapted to measure at least one of position, velocity and acceleration of the coil assembly with respect to the magnetic housing.

In another exemplary embodiment of the present invention, a position control system is provided. The position control system includes a voice coil actuator including a magnetic housing containing at least one magnet, a magnetic core coupled to the magnetic housing and extending from an interior surface of the magnetic housing, and a coil assembly adapted to move linearly with respect to the magnetic housing. The coil assembly forms a capacitive sensor with the magnetic core, the capacitive sensor adapted to measure at least one of position, velocity and acceleration of the coil assembly with respect to the magnetic housing and generates an output. The position control system also includes a signal conditioning circuit, a position/velocity control circuit and a driver. The signal conditioning circuit receives the output of the capacitive sensor, and processes the output to generate a voltage output. The position/velocity control circuit provides a feedback signal using the voltage output from the signal conditioning circuit. The driver drives the voice coil actuator using the feedback signal from the position/velocity control circuit.

In yet another exemplary embodiment according to the present invention, a method of measuring at least one of position, velocity and acceleration of a coil assembly with respect to a magnetic housing in a voice coil actuator, is provided. A capacitance variance generated when the coil assembly moves with respect to the magnetic housing, is measured. A feedback signal to control a movement of the coil assembly with respect to the magnetic housing, is generated using the capacitance variance.

These and other aspects of the invention will be more readily comprehended in view of the discussion herein and accompanying drawings.

BRIEF DESCRIPTION OF THE DRAWINGS

FIG. 2b is an equivalent circuit diagram of the capacitive sensor illustrated in FIG. 2a;

FIG. 4b is an equivalent circuit diagram of the capacitive sensor illustrated in FIG. 4a;

DETAILED DESCRIPTION

In exemplary embodiments of the present invention, capacitive sensors are used to measure the relative movement, relative positions and/or relative acceleration between a permanent magnetic housing and a coil assembly of a voice coil actuator. Turning now to the drawings, voice coil actuators that include capacitive sensors are shown. The capacitive sensors typically include three plates that are equivalent to a pair of series capacitors, although in other embodiments a greater number of plates can be used. In several exemplary embodiments, the position of the coil assembly with respect to the permanent magnetic housing in the voice coil actuator can be determined by measuring the capacitance of the capacitive sensor. Once the position of the coil is determined, the output of the capacitive sensor can be processed by control circuitry to regulate the position, motion and/or acceleration of the coil.

Figure 1:
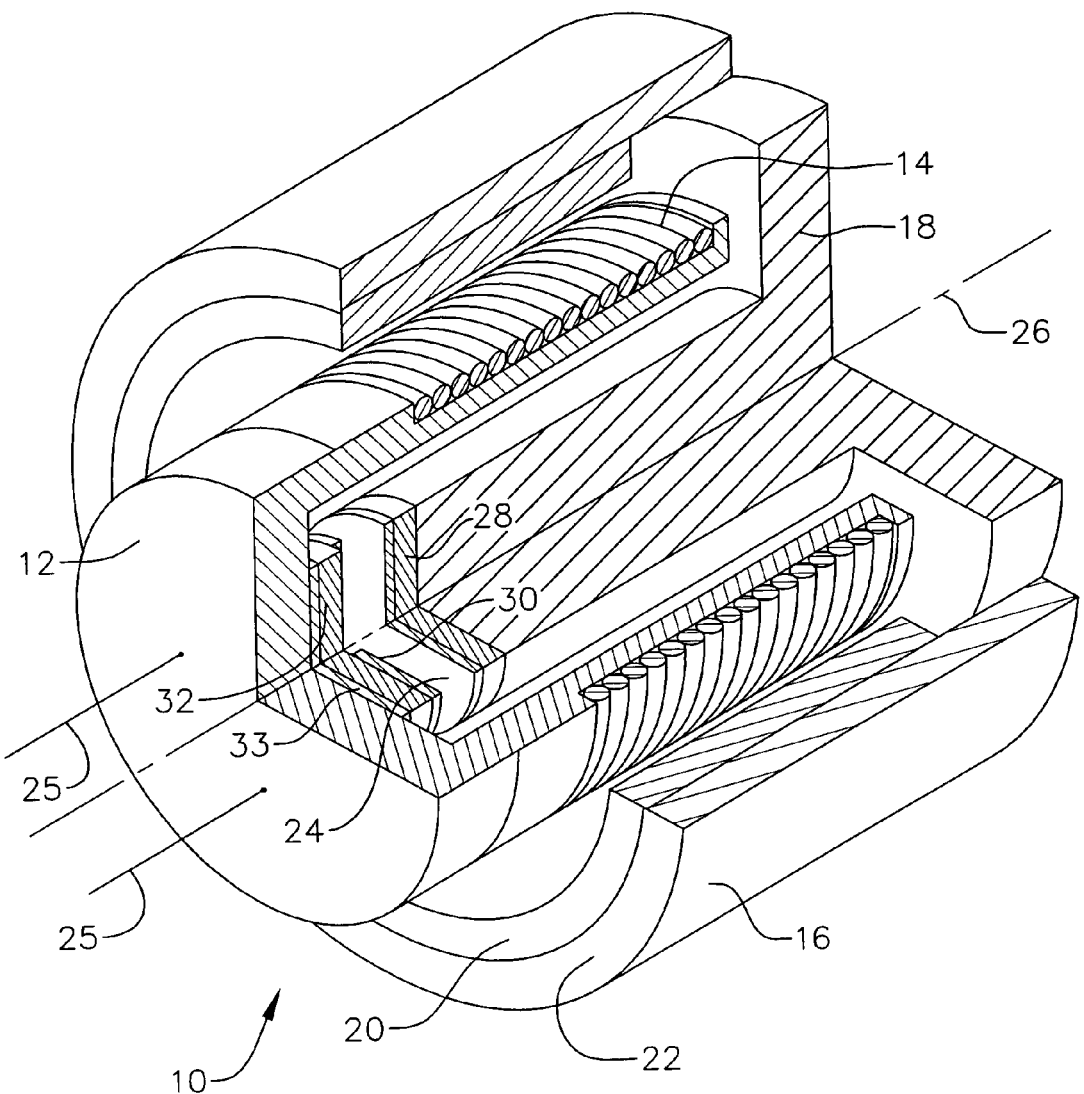
FIG. 1 is a perspective cut-away view of a voice coil actuator including a capacitive sensor in accordance with an exemplary embodiment of the present invention.

An exemplary embodiment of a linear voice coil actuator according to the present invention is shown in FIG. 1. A voice coil actuator 10 includes a coil assembly housing 12 around which is wrapped a tubular coil 14 of electrically conductive material such as copper wire. The coil assembly housing 12 and the tubular coil 14 together may be referred to as a coil assembly.

The coil assembly housing 12 forms a generally cylindrical tube that is closed at one end. The coil assembly housing 12 is at least partly contained within (or enveloped by) a magnetic circuit housing 16, which may also be referred to as a magnetic housing or a permanent magnet housing. The magnetic circuit housing 16 has a generally cylindrical shape and is open at one end. A cylindrical core 18 (or magnetic core) extends from the closed end of the magnetic circuit housing 16 and is set along the axial centerline of the magnetic circuit housing 16. The core 18 as shown in FIG. 1 has a solid body. In other embodiments, the core 18 may have one or more cavities formed therein.

The magnetic circuit housing 16 includes one or more magnets 20 mounted on an interior surface of a shell 22 made of ferromagnetic material such as soft iron. In the exemplary embodiment shown in FIG. 1, the one or more magnets 20 have a generally cylindrical shape and conforms to the contour of the interior surface of the shell 22, which also has a generally cylindrical shape. In one exemplary embodiment, a number of magnets are arranged so that they are facing radially inward and are all of the same polarity.

The shell 22 contacts the core 18, which is also constructed from a ferromagnetic material such as soft iron. The shell 22 may be fixedly attached to the core 18 or may be formed as a single integrated piece with the core 18. The magnet(s) 20, shell 22 and core 18 form a magnetic circuit that generates a magnetic field extending radially between the magnets 20 and the core 18. The coil assembly housing 12 is inserted into the magnetic circuit housing 16 so that the open end of the coil assembly housing 12 at least partly contains (or envelops) the core 18 and the open end of the magnetic circuit housing 16 at least partly contains (or envelops) the coil assembly housing 12.

In the illustrated embodiment, an area of electrically conductive material 24 is located on the end of the core that faces the interior surface of the closed end of the coil assembly housing 12. The area of the electrically conductive material 24 is electrically isolated from the core 18 by a layer of material 28, which is a poor conductor of electricity, and forms a part of a capacitive sensor. In other embodiments, the area of electrically conductive material 24 may not be provided, and instead, the end surface of the core 18 may be used to for the capacitive sensor.

The capacitive sensor also includes two or more areas of electrically conductive material 30 located inside the coil assembly housing 12 opposite the area of electrically conductive material 24. Two of these areas can be connected to electrical contacts 25. The areas of electrically conductive material 30 are separated by the coil assembly housing 12 by a layer of material 32, which is similar to the layer of material 28 in that it is a poor conductor of electricity. Another area of electrically conductive material 33 is disposed between the coil assembly housing 12 and the layer of material 32 in the embodiment illustrated in FIG. 1. The areas of electrically conductive material 30, the layer of material 32 and the area of electrically conductive material 33 may have a simple printed circuit board structure.

Figure 2A:
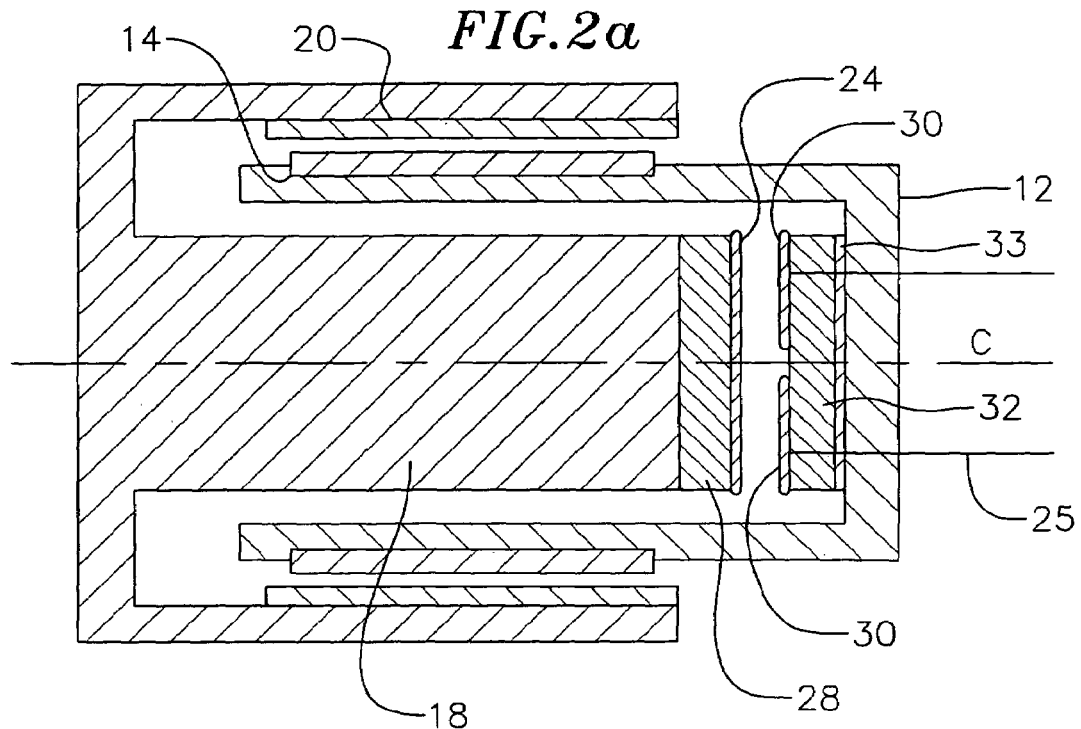
FIG. 2a is a schematic cross-sectional view of the voice coil actuator of FIG. 1.

The elements of a capacitive sensor in accordance with an exemplary embodiment of the present invention can be illustrated by taking a cross-section of the inventive voice coil actuator shown in FIG. 1 along the line 26. Such a cross-section is shown in FIG. 2a. As all elements of FIG. 2a that are essential for the complete understanding of the illustrated embodiment have been described in reference to FIG. 1, they will not be discussed again in reference to FIG. 2a.

Each of the two areas of electrically conductive material 30 mounted within the coil assembly housing 12 forms a capacitor with the area of electrically conductive material 24 mounted on the end of the core 18. The two capacitors are linked in series by the area of electrically conductive material 24. Therefore, the areas of electrically conductive material form a circuit including two capacitors in series between the contacts 25. Although the present invention is in no way intended to be limited by theory, the ideal capacitance of the two capacitors formed by the areas of electrically conductive material can be considered as follows:

$$C = \frac{C_1 C_2}{C_1 + C_2}$$

where $C_1$ and $C_2$ represent capacitances of the capacitors $C_1$ and $C_2$, respectively. In this and other embodiments/equations, the same symbol will be used for a capacitor and its capacitance for ease of description.

As the coil assembly housing 12 (or coil assembly) moves within the magnetic circuit housing 16, the distance between the two areas of electrically conductive material 30 mounted within the coil assembly housing 12 and the area of electrically conductive material 24 mounted on the end of the core 18 varies. This variance also varies the capacitance of $C_1$ and $C_2$. Although not linear, the value C can change significantly with small variations in the position of the coil assembly housing 12 relative to the magnetic circuit housing 16. The present invention is not limited by theory, however, theory predicts that changes in the capacitance C, which is the total capacitance of the capacitive sensor, will vary ideally as the reciprocal of the change in distance.

Figure 2B:
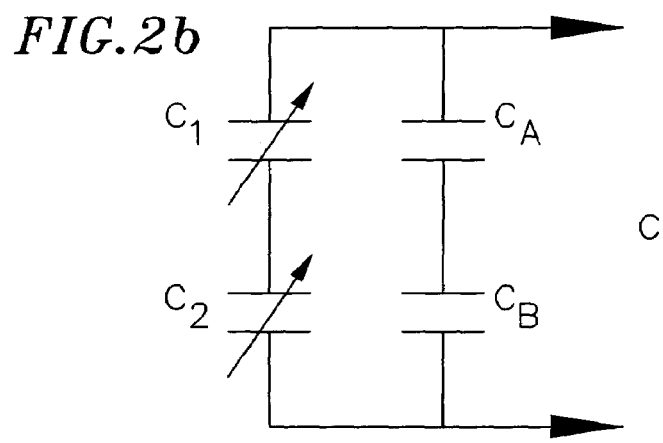

It can be seen in FIG. 2b, which is an equivalent circuit diagram of the capacitive sensor of FIG. 2a, that there actually are additional capacitors $C_A$ and $C_B$ that are present. The capacitors $C_A$ and $C_B$ are respectively formed between the areas 30 and the area 33. Hence, the total capacitance of the capacitive sensor is given as follows:

$$C = \frac{C_1 C_2}{C_1 + C_2} + \frac{C_A C_B}{C_A + C_B}$$

However, since the capacitors $C_A$ and $C_B$ have fixed capacitances, they do not affect the distance measurements performed using variable capacitors $C_1$ and $C_2$.

In one embodiment, the areas of electrically conductive material are formed from plates of metal such as copper. In this case, the areas of electrically conductive material 24, 30 and 33 may be referred to as plates or metal plates. In other embodiments, any other suitable material may be used to form the areas 24, 30 and 33. The layers of material that are poor conductors of electricity are constructed from any suitable dielectric material such as epoxy glass (e.g., G10), TEFLON® or any other suitable dielectric material. TEFLON® is a registered trademark of E.I. Du Pont De Nemours and Company, a Delaware corporation.

Figure 3A:
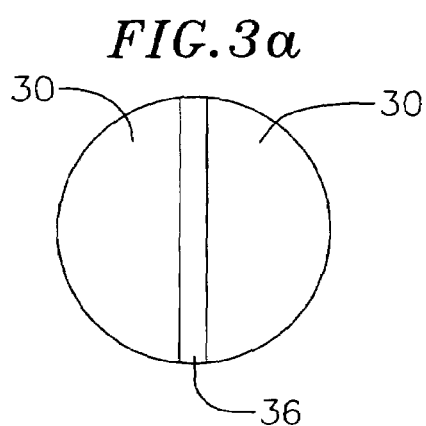
FIG. 3a is a top view of two regions of electrically conductive material in accordance with an exemplary embodiment of the present invention.

An arrangement of the two areas of electrically conductive material 30 mounted to the interior of the closed end of a coil assembly housing 12 in accordance with an exemplary embodiment of the present invention is shown in FIG. 3a, which shows the pattern used in the capacitive sensor of FIG. 2a. The two areas of electrically conductive material 30 resemble half circles and are separated by a gap 36. As discussed above, these areas of electrically conductive material 30 combine with the area of electrically conductive material 24 shown in FIGS. 1 and 2a to form capacitors.

Figure 3B:
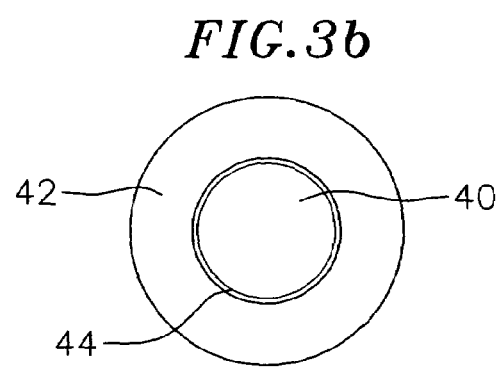
FIG. 3b is a top view of two regions of electrically conductive material in accordance with another exemplary embodiment of the present invention.

In other embodiments, capacitors can be formed using a wide variety of patterns of electrically conductive material involving areas that are electrically isolated from each other. For example, an embodiment of the present invention where the two areas of electrically conductive material are a circle 40 and a concentric ring 42 is shown in FIG. 3b. The circle and the concentric ring are separated by a gap 44.

Figures 4A, 5:
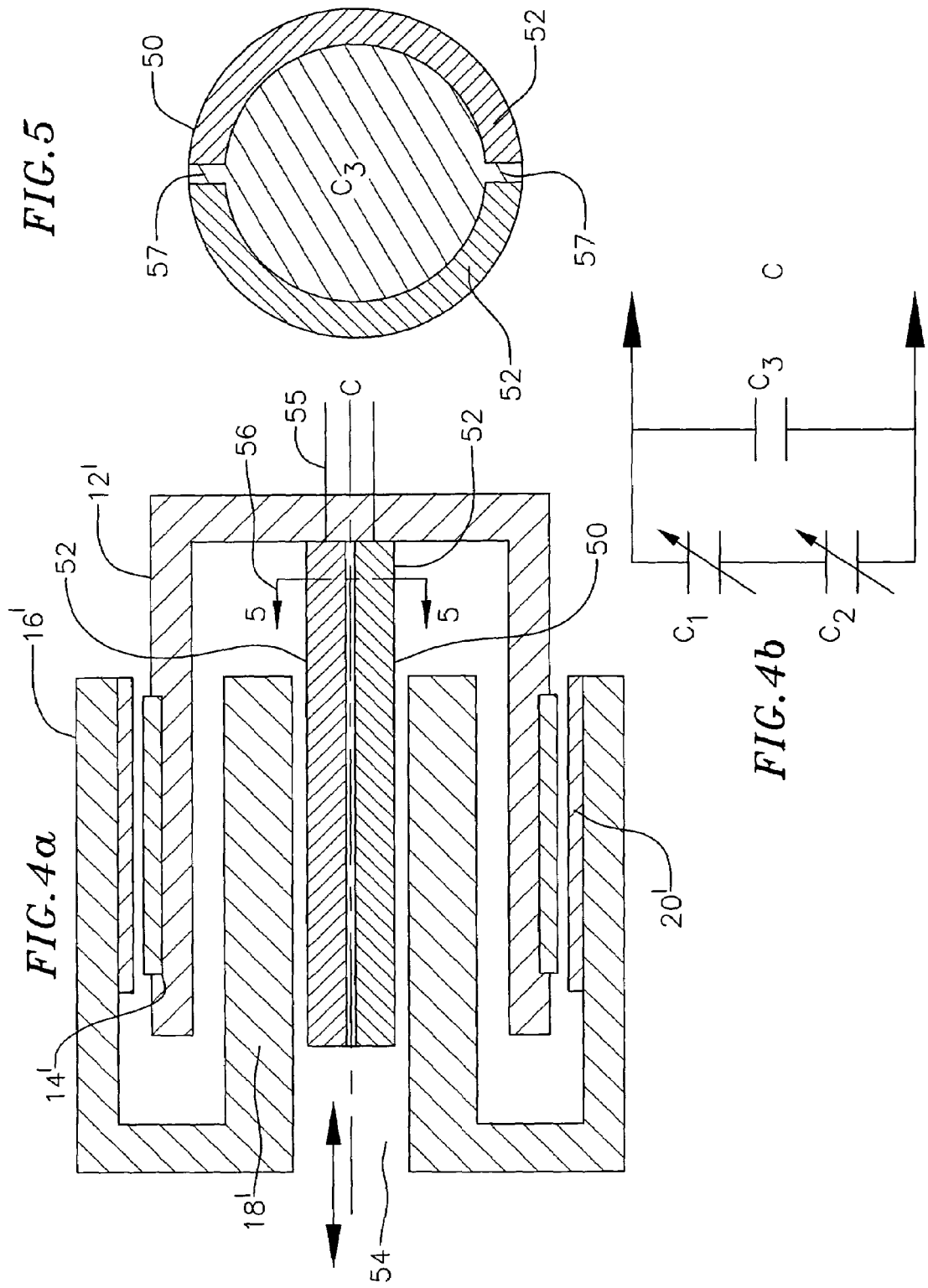
FIG. 4a is a schematic cross-sectional view of a voice coil actuator having a capacitive sensor in accordance with another exemplary embodiment of the present invention that includes areas of electrically conductive material located on an insulated rod attached to a coil assembly housing.
FIG. 5 is a schematic cross-sectional view of an insulated rod in accordance with an exemplary embodiment of the present invention.

Another exemplary embodiment of a voice coil actuator including a capacitive sensor in accordance with the present invention is shown in FIG. 4a. The voice coil actuator of FIG. 4a is similar to the voice coil actuator shown in FIGS. 1 and 2a in that it includes a core assembly housing 12' having a tubular coil 14' mounted thereon, and a magnetic circuit housing 16' having one or more permanent magnets 20' mounted thereon. However, the configuration of the capacitive sensor is different.

In the exemplary embodiment illustrated in FIG. 4a, the core assembly housing 12' includes an insulated rod 50. The insulated rod 50 is connected to a closed end of the core assembly housing 12' so that the two structures are co-axial. The insulated rod 50 includes two areas of electrically conductive material 52. In order to accommodate the insulated rod 50 when the voice coil actuator is assembled, a core 18' is hollow and has a cavity 54. In the completed structure, the insulated rod 50 is inserted into the cavity 54 within the core 18'.

The position of the areas of electrically conductive material are shown in the cross section taken along the line 56 in FIG. 4a, which is shown in FIG. 5. The insulated rod 50 has two areas of electrically conductive material 52 lining the external surface of the insulated rod that are separated by two gaps 57. The interior of the insulated rod can be filled with air or another material that is a poor conductor of electricity. The insulated rod 50 has a generally cylindrical shape, and the two areas of electrically conductive material 52 are formed to have a generally semi-circular cross-section and conform to the contour of the insulated rod 50. Because of the gaps 57, the cross-sections of the two areas of the electrically conductive material 52 are not complete semi-circles.

The insulated rod 50 may be constructed from any suitable dielectric material such as epoxy glass (e.g., G10), TEFLON®, or the like. In one embodiment, the two areas of electrically conductive material 52 are constructed from copper plates, or any other suitable metal. The two areas of electrically conductive material 52, when they are formed in a form of plates, may also be referred to as plates or metal plates.

Each of the two areas of electrically conductive material 52 shown in FIGS. 4a and 5 forms a capacitor with the ferromagnetic material used in the construction of the core 18'. The ferromagnetic material of the core 18' also serves to connect the two capacitors in series. A third capacitor is formed by the two areas of electrically conductive material 52. The third capacitor is in parallel with the two capacitors connected in series.

As the coil assembly housing 12' moves relative to the core 18', the proportion of the areas of electrically conductive material 52 on the insulated rod 50 that are contained within (or enveloped by) the core 18' can vary. This variation results in a variation in the capacitance of the two capacitors formed by the areas of electrically conductive material 52 and the core 18'. Theory predicts that a capacitor's capacitance will vary directly with respect to the area of the plates of the capacitor. In the case of the two capacitors formed by the areas of electrically conductive material 52 and the ferromagnetic material of the core 18', the area of the plate of each capacitor that provides variable capacitance corresponds to the portion of the area of electrically conductive material 52 on the insulated rod 50 that is contained within (or enveloped by) the core 18'.

The capacitance of the third capacitor does not vary with the position of the coil assembly housing 12', because the two areas of electrically conductive material 52 on the insulated rod 50 are fixed relative to each other.

Figure 4B:
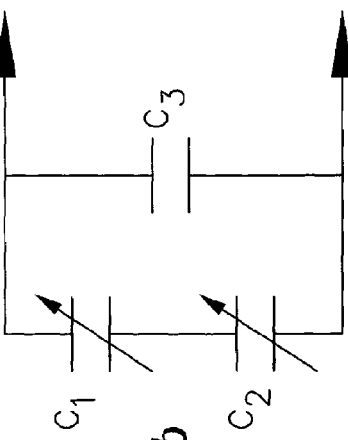

It can be seen in FIG. 4b, which is an equivalent circuit diagram of the capacitive sensor of FIG. 4a, that a capacitor $C_3$ is arranged in parallel with the variable capacitors $C_1$ and $C_2$ that are arranged in series. As discussed above, the capacitors $C_3$ is formed between the areas of electrically conductive material 52.

As mentioned previously, the scope of the present invention is not intended to be limited by theory. That said, the capacitance of the sensor shown in FIG. 4a will ideally have a capacitance given by the following equation:

$$C = \frac{C_1 C_2}{C_1 + C_2} + C_3$$

where $C_1$ and $C_2$ are the capacitances of the two capacitors formed by the areas of electrically conductive material and the ferromagnetic material of the core; and $C_3$ is the capacitance of the capacitor formed by the two areas of electrically conductive material 52.

As discussed above, the capacitances $C_1$ and $C_2$ vary linearly with the position of the coil assembly housing 12', and the capacitance $C_3$ is fixed. Therefore, theory predicts linear variation of the capacitance C with movement of the, coil.

As discussed above, capacitive sensors in exemplary embodiments according to the present invention have capacitances that vary with the position of a coil of a voice coil actuator with respect to the magnetic circuit housing of the voice coil actuator. A variety of circuits can be used to monitor the output of sensors in accordance with the present invention. There are several techniques for monitoring and signal conditioning an output of a capacitive sensor. The most common methods are a differential amplifier technique and a frequency oscillator technique.

Figure 6:
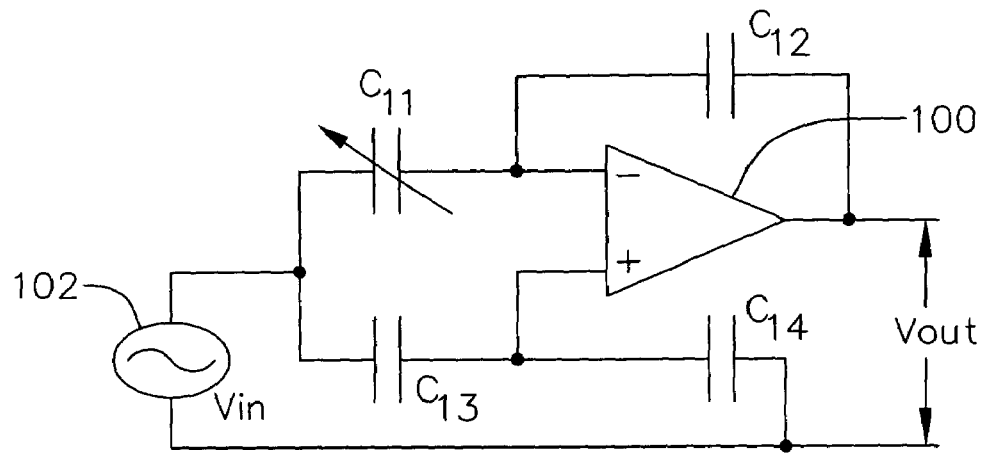
FIG. 6 is a circuit diagram of a signal conditioning circuit for a capacitive sensor in accordance with an exemplary embodiment of the present invention.

A signal conditioning circuit for use with a capacitive sensor in accordance with an exemplary embodiment of the present invention is shown in FIG. 6, which is a simple bridge circuit. In FIG. 6, a variable capacitor $C_{11}$ represents the variable capacitance C of the capacitive sensor of FIG. 2a or FIG. 4a. The variable capacitor $C_{11}$ is connected between an inverting input of an amplifier 100 and a voltage source 102. A capacitor $C_{13}$ is connected between a non-inverting input of the amplifier 100 and the voltage source 102. Further, a capacitor $C_{14}$ is coupled between the non-inverting input of the amplifier 100 and ground. In addition, a capacitor C12 is connected between the inverting input of the amplifier 100 and an output of the amplifier 100. The output of the signal conditioning circuit of FIG. 6 has a voltage of Vout with respect to ground.

The output Vout is defined by the equation of Vout=½(1−$C_{12}/C_{11}$)Vin where $C_{11}$ is the sensor capacitance (i.e., the capacitance C of the capacitive sensor), $C_{12}$=½$C_{11}$max (i.e., one-half of the maximum capacitance of the variable capacitance $C_{11}$) and $C_{13}$=$C_{14}$. When $C_{11}$=$C_{12}$, Vout=0.

Figure 7:
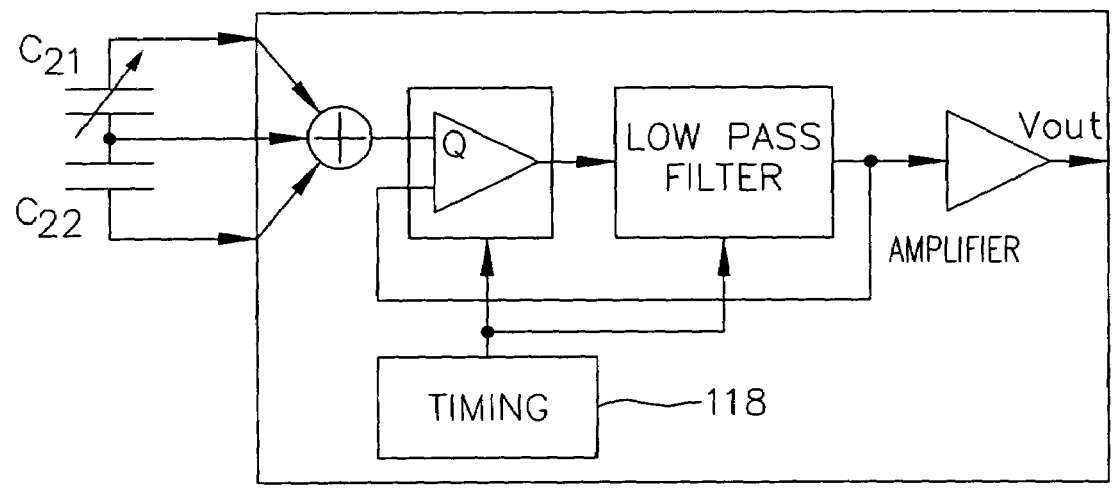
FIG. 7 is an equivalent circuit diagram of a signal conditioning circuit implemented using Application Specific Integrated Circuit (ASIC) for a capacitive sensor in accordance with an exemplary embodiment of the present invention.

Although the signal conditioning circuit of FIG. 6 is adequate and provides an output that would be proportional to the changes of the variable capacitance $C_{11}$, with the current advances in Application Specific Integrated Circuit (ASIC) technology, a typical off-the shelf capacitive sensor driver as shown in FIG. 7 is readily available and provides a more ideal signal conditioning circuit. The circuit of FIG. 7 is based on a charge compensation feedback loop, and converts the difference of two capacitances (i.e., $C_{21}$ and $C_{22}$), relative to their sum, into an analog voltage. Here, $C_{21}$ is the variable capacitance C of the capacitive sensor of FIG. 2a or 4a. The output characteristic of the signal conditional circuit of FIG. 7 is $$Vout = \left(1 + G \cdot \frac{C_{21} - C_{22}}{C_{21} + C_{22}}\right) \cdot \frac{Vcc}{2}$$

where G is the gain of the amplifier and Vcc is the supply voltage of the ASIC chip. Any other suitable circuitry known to those skilled in the art may be used to generate the analog voltage output.

Figure 8:
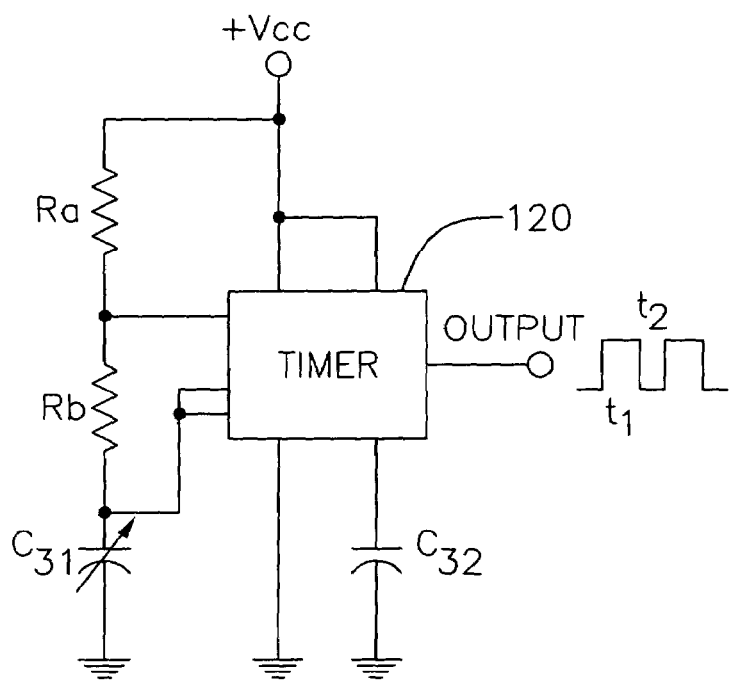
FIG. 8 is a circuit diagram for a timing circuit used in a frequency oscillator technique in accordance with an exemplary embodiment of the present invention.

As can be seen in FIG. 8, in the frequency oscillator technique, when a variable capacitance $C_{31}$ is applied to an RC oscillator circuit using a timer 120 (e.g., 555 Timer), the output frequency of the timer 120 varies according to the changes of the capacitance. It can be seen in FIG. 8 that a supply voltage +Vcc is divided by a voltage divider resistors Ra and Rb, and applied to the timer 120. The variable capacitor $C_{31}$ is coupled between the timer 120 and ground. A capacitor $C_{32}$ is also coupled between the timer 120 and ground. Here, the variable capacitor $C_{31}$ represents the variable capacitance C of the capacitive sensor of FIG. 2a or FIG. 4a.

As discussed above, voice coil actuators can be used in a variety of applications. One typical application of the voice coil actuator in exemplary embodiments of the present invention is in position control operations. In position control operations, the position and velocity of the coil are sensed and a feedback signal is used to control the position of the coil. The capacitive sensors in exemplary embodiments of the present invention may, for example, be used to sense the position, velocity and/or acceleration and provide the feedback.

Figure 9:
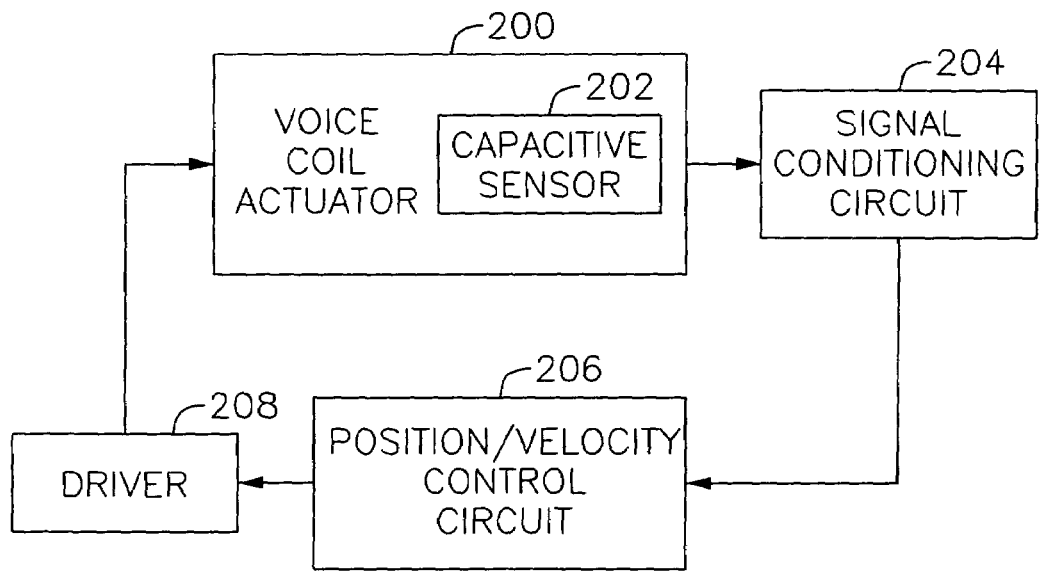
FIG. 9 is a block diagram for a position control circuit in accordance with an exemplary embodiment of the present invention.

As can be seen in FIG. 9, a voice coil actuator 200 includes a capacitive sensor 202. The voice coil actuator 200 and the capacitive sensor 202, for example, can be the voice coil actuator and the capacitive sensor, respectively, of FIG. 2a or FIG. 4a. The capacitive sensor output of the capacitive sensor 202 is provided to a charge conditioning circuit 204, which provides a voltage output to a position/velocity control circuit 206. The signal conditioning circuit 204 may, for example, be any of the signal conditioning circuits illustrated in FIGS. 6-8, or any other suitable signal conditioning circuit. The make and use of the position/velocity control circuit 206 for providing a feedback to a driver 208 to control the position, velocity and/or acceleration of the coil assembly movement in the voice coil actuator 200 is known to those skilled in the art. The driver 208 drives the voice coil actuator to adjust position, velocity and/or acceleration of the sensor assembly with respect to the magnetic housing of the voice coil actuator 200. By way of example, the driver 208 may provide a current for driving the voice coil actuator 200.

Although the present invention has been described in reference to certain exemplary embodiments, those skilled in the art would understand that additional variations, substitutions and modifications can be made to the system, as disclosed, without departing form the spirit or scope of the invention. For example, although the above description depicts circular coils, coils of any shape such as square coils can be used. In addition, the other components of a voice coil actuator in accordance with the present invention can be of shapes compatible with the shape of the coil. Accordingly, the scope of the invention should be determined not by the embodiments illustrated, but by the appended claims and their equivalents.

What is claimed is:

1. A voice coil actuator having a capacitive sensor, comprising:
    a magnetic housing containing at least one magnet, the magnetic housing having a wall that defines a first cavity;
    a magnetic core coupled to the magnetic housing and extending from an interior surface of the magnetic housing in a direction of a center axis of the wall of the magnetic housing; and
    a coil assembly having a wall defining a second cavity that at least partly envelops the magnetic core, disposed at least partly inside the first cavity, and adapted to move linearly with respect to the magnetic housing, wherein the coil assembly has formed thereon at least two electrically conducive areas;
    wherein the coil assembly forms the capacitive sensor with the magnetic core, the capacitive sensor adapted to measure at least one of position, velocity and acceleration of the coil assembly with respect to the magnetic housing; and wherein the magnetic core comprises a wall defining a third cavity, and the coil assembly has formed thereon an insulated rod that extends from an interior surface of the coil assembly into the third cavity, wherein the insulated rod has disposed thereon a pair of electrically conductive areas that form a capacitor with each other and form respective capacitors with the wall of the magnetic core, thereby forming the capacitive sensor.

2. The voice coil actuator of claim 1, wherein the coil assembly has formed thereon the at least two electrically conductive areas on an interior surface opposing an end surface of the magnetic core, wherein the at least two electrically conductive areas and the end surface of the magnetic core form the capacitive sensor.

3. The voice coil actuator of claim 2, wherein the at least two electrically conductive areas comprise two metal plates that are separated from each other by a gap.

4. The voice coil actuator of claim 2, wherein the at least two electrically conductive areas each generally have a shape of a semi-circle.

5. The voice coil actuator of claim 2, wherein the at least two of the electrically conductive areas respectively have a shape of a circle and a concentric ring around the circle.

6. The voice coil actuator of claim 2, wherein the at least two electrically conductive areas are disposed on a poorly electrically conductive layer disposed on the interior surface of the coil assembly.

7. The voice coil actuator of claim 2, wherein the magnetic core has formed thereon at the end surface an electrically conductive area opposite the at least two electrically conductive areas.

8. The voice coil actuator of claim 1, wherein the at least one of the position, velocity and acceleration is measured by detecting a capacitance variance of the capacitive sensor.

9. The voice coil actuator of claim 1, wherein the wall of the magnetic housing and the wall of the coil assembly each have a generally cylindrical shape.

10. The voice coil actuator of claim 1, wherein the wall of the magnetic core has a generally cylindrical shape.

11. The voice coil actuator of claim 1, wherein the at least one of the position, velocity and acceleration is measured by detecting a capacitive variance of the capacitors formed between the electrically conductive areas and the wall of the magnetic core.

12. The voice coil actuator of claim 1, wherein the electrically conductive areas comprise metal plates mounted on the insulated rod with a gap therebetween.

13. A position control system comprising:
a voice coil actuator comprising a magnetic housing containing at least one magnet, a magnetic core coupled to the magnetic housing and extending from an interior surface of the magnetic housing, and a coil assembly adapted to move linearly with respect to the magnetic housing, wherein the coil assembly forms a capacitive sensor with the magnetic core, the capacitive sensor adapted to measure at least one of position, velocity and acceleration of the coil assembly with respect to the magnetic housing and generates an output;

wherein the magnetic core comprises a wall defining a cavity, and the coil assembly has formed thereon an insulated rod that extends from an interior surface of the coil assembly into the cavity, wherein the insulated rod has disposed thereon a pair of electrically conductive areas that form a capacitor with each other and form respective capacitors with the wall of the magnetic core, thereby forming the capacitive sensor;

a signal conditioning circuit for receiving the output of the capacitive sensor, and processing the output to generate a voltage output;

a position/velocity control circuit for providing a feedback signal using the voltage output from the signal conditioning circuit; and a driver for driving the voice coil actuator using the feedback signal from the position/velocity control circuit.

14. The position control system of claim 13, wherein the at least one of the position, velocity and acceleration is measured by detecting a capacitive variance of the capacitors formed between the electrically conductive areas and the wall of the magnetic core.

15. The position control system of claim 13, wherein the coil assembly has formed thereon at least two electrically conductive areas on an interior surface opposing an end surface of the magnetic core, wherein the at least two electrically conductive areas and the end surface of the magnetic cores form the capacitive sensor.

16. The position control system of claim 13, wherein the at least one of the position, velocity and acceleration is measured by detecting a capacitance variance of the capacitive sensor.

17. The position control system of claim 13, wherein the wall of the magnetic core has a generally cylindrical shape.

18. A method of measuring at least one of position, velocity and acceleration of a coil assembly with respect to a magnetic housing in a voice coil actuator, the method comprising:
measuring a capacitance variance generated when the coil assembly moves substantially in a single direction with respect to the magnetic housing, wherein the capacitive variance is generated between a pair of electrically conductive areas disposed on an insulated rod coupled to an interior surface of the coil assembly and a cylindrical wall of a magnetic core coupled to the magnetic housing, wherein the insulated rod is moved linearly in and out of a cavity defined by the cylindrical wall as the coil assembly is moved with respect to the magnetic housing; and
generating a feedback signal using the capacitance variance to control a movement of the coil assembly with respect to the magnetic housing.

19. The method of claim 18, wherein the capacitive variance is generated between a pair of electrically conductive areas disposed on the coil assembly and an electrically conductive area disposed on a magnetic core coupled to the magnetic housing.

20. The method of claim 18, further comprising driving the voice coil actuator with a driving signal generated using the feedback signal.

* * * * *